US008400673B2

(12) United States Patent
Depta et al.

(10) Patent No.: US 8,400,673 B2
(45) Date of Patent: Mar. 19, 2013

(54) VALUE DOCUMENT COMPRISING A SERIAL NUMBER

(75) Inventors: Georg Depta, Rosenheim (DE); Karlheinz Mayer, Augsburg (DE); Christof Baldus, Munich (DE); Peter Franz, Pienzenau-Bruck (DE); Max Voit, Benediktbeuern (DE); Walter Dorfler, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 1406 days.

(21) Appl. No.: 11/568,535

(22) PCT Filed: Apr. 25, 2005

(86) PCT No.: PCT/EP2005/004393

§ 371 (c)(1), (2), (4) Date: Nov. 12, 2007

(87) PCT Pub. No.: WO2005/108106

PCT Pub. Date: Nov. 17, 2005

(65) Prior Publication Data

US 2008/0088859 A1 Apr. 17, 2008

(30) Foreign Application Priority Data

May 5, 2004 (DE) ........................ 10 2004 022 079

(51) Int. Cl.
*G06K 15/00* (2006.01)

(52) U.S. Cl. ........... 358/1.7; 358/1.1; 358/1.15; 358/1.9

(58) Field of Classification Search ................... 358/1.1, 358/1.13, 1.15, 1.7
See application file for complete search history.

(56) References Cited

U.S. PATENT DOCUMENTS

| | | | | |
|---|---|---|---|---|
| 4,207,814 | A | 6/1980 | Schenk | |
| 4,234,214 | A * | 11/1980 | Lee | 283/57 |
| 6,164,701 | A | 12/2000 | Murl | |
| 2004/0012825 | A1* | 1/2004 | Tesavis | 358/474 |
| 2004/0054634 | A1* | 3/2004 | Tak | 705/400 |
| 2004/0207871 | A1* | 10/2004 | Ando | 358/1.15 |
| 2004/0232691 | A1* | 11/2004 | Lazzerini | 283/67 |
| 2006/0145468 | A1 | 7/2006 | Plaschka et al. | |

(Continued)

FOREIGN PATENT DOCUMENTS

| | | |
|---|---|---|
| DE | 2836529 | 3/1979 |
| EP | 0768189 | 4/1997 |

(Continued)

OTHER PUBLICATIONS

German 100 mark banknote of 1908; see German 100 Mark banknote images obtained from website, http://aes.iupui.edu/rwise/countries/germany1.html.

(Continued)

*Primary Examiner* — King Poon
*Assistant Examiner* — Iriana Cruz
(74) *Attorney, Agent, or Firm* — Greenlee Sullivan P.C.

(57) ABSTRACT

The invention relates to a value document, especially a banknote, having an individualizing mark that is applied at least once each to the front and the reverse of the value document. Here, at least one of the individualizing identifiers applied to the front and reverse is applied to the value document with a non-contact method.

64 Claims, 6 Drawing Sheets

U.S. PATENT DOCUMENTS

Figure 1:
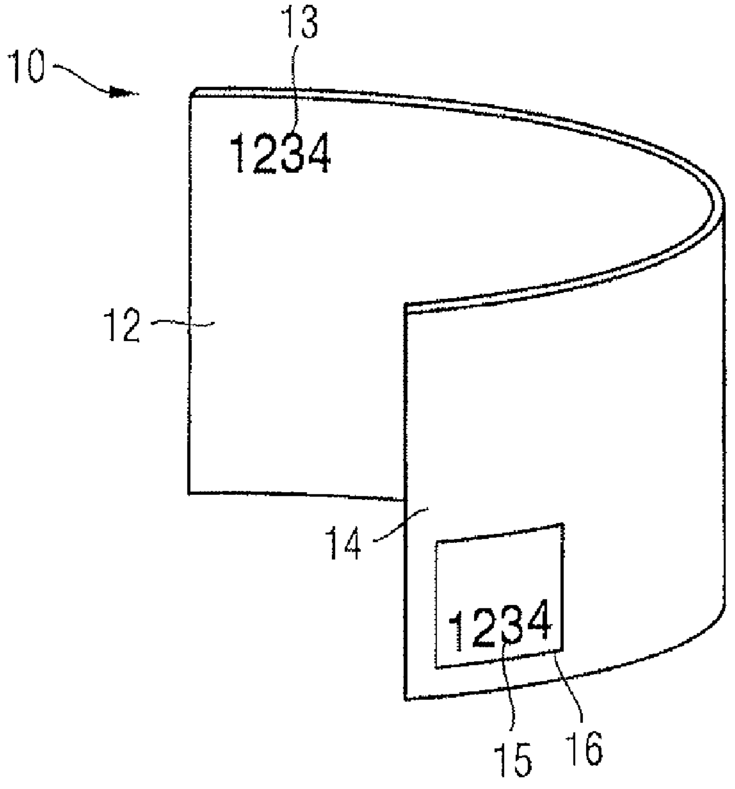

| | | | |
|---|---|---|---|
| 2007/0165182 | A1 | 7/2007 | Hoffmuller |
| 2007/0211238 | A1 | 9/2007 | Hoffmuller |
| 2007/0216518 | A1 | 9/2007 | Hoffmuller |
| 2007/0229928 | A1 | 10/2007 | Hoffmuller |
| 2007/0241551 | A1 | 10/2007 | Graff |
| 2007/0246933 | A1 | 10/2007 | Heim |
| 2007/0274559 | A1 | 11/2007 | Depta |
| 2008/0014378 | A1 | 1/2008 | Hoffmuller |
| 2008/0054621 | A1 | 3/2008 | Burchard |
| 2008/0079257 | A1 | 4/2008 | Fessl |
| 2008/0088859 | A1 | 4/2008 | Depta |
| 2008/0160226 | A1 | 7/2008 | Kaule |
| 2008/0163994 | A1 | 7/2008 | Hoppe |
| 2008/0198468 | A1 | 8/2008 | Kaule |
| 2008/0216976 | A1 | 9/2008 | Ruck |
| 2008/0250954 | A1 | 10/2008 | Depta |
| 2008/0258456 | A1 | 10/2008 | Rahm |
| 2009/0001709 | A1 | 1/2009 | Kretschmar |
| 2009/0008923 | A1 | 1/2009 | Kaule |

FOREIGN PATENT DOCUMENTS

| | | |
|---|---|---|
| EP | 0825036 | 2/1998 |
| WO | WO 03/023723 | 3/2003 |
| WO | WO 03/099579 | 12/2003 |
| WO | WO 2004/009371 | 1/2004 |
| WO | WO 2005105473 | 11/2005 |
| WO | WO 2005105474 | 11/2005 |
| WO | WO 2005105475 | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006040069 | 4/2006 |
| WO | WO 2006056342 | 6/2006 |
| WO | WO 2006072380 | 7/2006 |
| WO | WO 2006087138 | 8/2006 |
| WO | WO 2006099971 | 9/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007076952 | 7/2007 |
| WO | WO 2007079851 | 7/2007 |
| WO | WO 2007115648 | 10/2007 |

OTHER PUBLICATIONS

Ron Wise's Banknoteworld: Germany; pages from website http://aes.iupui.edu/rwise/countries/germany1.html.

International Search Report, International Application No. PCT/EP2005/004393, 5 pages, Sep. 23, 2005.

International Preliminary Report on Patentability, International Application No. PCT/EP2005/004393, 9 pages, Dec. 14, 2006.

* cited by examiner

VALUE DOCUMENT COMPRISING A SERIAL NUMBER

CROSS-REFERENCE TO RELATED APPLICATIONS

This application is the National Stage of International Application No. PCT/EP2005/004393, filed Apr. 25, 2005, which claims the benefit of German Patent Application DE 10 2004 022 079.4, filed May 5, 2004, both of which are hereby incorporated by reference to the extent not inconsistent with the disclosure herewith.

The invention relates to a value document, especially a banknote, having an individualizing mark, such as a serial number. The invention further relates to a method for manufacturing such a value document.

Value documents, such as banknotes, stocks, bonds, certificates, vouchers, checks, admission tickets and the like, are normally provided with an individualizing mark, such as a serial number. To increase security, this mark is often applied to the value document multiple times. For example, banknotes are doubly numbered so that each half of the banknote is uniquely identifiable. Here, the two numerals are normally identical.

The security relevance of conventional numbering is comparatively low. For example, the numbering requires a white or at least light background, which, in addition, must not be executed in intaglio printing, since otherwise ink residues can get in the numbering units and impair their function. Thus, due to the usual register variations, a relatively large space must be held out for the numbering.

From publication U.S. Pat. No. 4,234,214 is known a banknote having a readable code composed of letters and numbers that comprises a sequential serial number for uniquely identifying the banknote. The readable code is applied to a first position on the banknote in positive form and to a second position in negative form with a polychromatic background. The manufacture of such a negative or inverse representation of the serial number is comparatively complex, since it requires a series of process steps.

Based on that, the object of the present invention is to propose a value document of the kind mentioned above that is easy to manufacture and exhibits high counterfeit security.

This object is solved by the value document having the features of the main claim. A method for its manufacture is specified in the coordinated claim. Extensions of the present invention are the subject of the dependent claims.

According to the present invention, the individualizing mark, for example the serial number, is applied at least once each to the front and the reverse of the value document, at least one of the individualizing identifiers applied to the front and reverse being applied to the value document with a non-contact method. In the context of this description, the mark itself, for example a certain serial number, is always referred to as "mark", while the invididual, multiply applied embodiments are referred to as "identifiers". The various identifiers all represent the same mark, for example the same serial number, even if they are executed in various type sizes or various graphical designs. In certain embodiments, one of the marks can be provided with individual extensions, such as an additional check digit or a symbol.

Such two-sided labeling of the value document reduces the space requirement on each of the sides and thus increases the designer's freedom of design. With conventional letterpress methods, two-sided labeling can be accomplished only with a second machine cycle and is thus too costly, since the numbering of banknotes with mechanically or electromechanically switched numbering units involves high setup and maintenance expenses.

Moreover, the use of a non-contact method for labeling opens up the possibility to impart new security features to the numbering or an individualizing mark in general, and simultaneously offsets existing limitations of letterpress numbering. For example, there is especially the possibility to depart from the conventional linear configuration of the numerals or to replace the numerals with symbol codes that take up considerably less space, for example two-dimensional codes, such as the so-called data-matrix code.

The high expense for setting up numbering units can thus largely be eliminated, since the non-contact methods can define the position of the identifier by computer control. Especially when employing laser vector coders, a large adjustable stroke is available. The high expenditure of time and personnel for maintaining the numbering unit is eliminated or considerably reduced.

In a preferred embodiment of the present invention, at least one of the individualizing identifiers is applied to the value document by the action of a laser beam. This kind of non-contact labeling with a laser, explained in detail below, offers the designer the freedom to affix the identifiers at any location on the value document, even the conventionally practically inaccessible border area of the value document. In connection with a tactile embodiment of the identifiers, this has the additional advantage that the identifier can be quickly and easily verified as an authenticating feature since, for example, banknotes are held and touched predominantly on the edge in ordinary payment transactions.

Preferably, on the front and/or the reverse of the value document is disposed at least one laser-sensitive identifier area that is provided with an individualizing identifier by the action of a laser beam. In expedient embodiments of the value document according to the present invention, here, on the front and reverse are disposed opposing identifier areas containing congruent identifiers. If the opposing identifier areas are simultaneously inscribed, for example, with the same laser beam, a perfect register results. The identifier thus constitutes a valuable authentication mark that is difficult to imitate.

Advantageously, at least one of the identifier areas is formed by a laser-sensitive recording layer applied to the value document. This recording layer can comprise, for example, a printing layer, especially an intaglio printing layer, a screen printing layer, an effect ink layer, an absorbing ink layer, or a printing layer composed of a mixture of a non-absorbing printing ink with an absorbing ink or other absorbing substances. In other embodiments, the laser-sensitive recording layer comprises a metal layer or a printing ink containing laser-radiation-absorbing additives, such as graphite or soot. In particular, the recording layer can be formed by a security element provided with a metallic strip or patch. This security element can also contain additional layers, such as a plastic layer in which there are diffraction structures in the form of a relief.

In addition to the cited possibility of producing the identifier areas through applied layers, alternatively or additionally, at least one of the identifier areas can also be formed by a laser-sensitive recording region in the substrate of the value document itself. Such a laser-sensitive recording region can be produced by introducing absorbing substances into the value document substrate. Here, examples of absorbing substances that can be used include $TiO_2$, soot particles, interference pigments and infrared absorbers.

At least one of the identifiers preferably exhibits a visually perceptible color shift. The identifier is especially blackened. Such a color shift can be achieved or intensified for example by suitable additives in the identifier areas, which effect a color alteration upon impingement by the laser radiation. These additives can be contained both in applied recording layers and in the recording areas of the substrate. The color alteration itself can be caused thermally or be triggered by other color shift mechanisms, for example by chemical transformation. A thermally produced color alteration can be effectively stimulated by suitable absorption substances. Provision can also be made for an uppermost ink layer to not react with the laser radiation, and the color alteration to be produced only in an underlying ink layer. In place of visible ink layers, lacquers that are invisible to the human eye can also be employed.

According to a further particular embodiment, at least one of the identifiers exhibits a tangible marking having a relief structure. Tangible markings can be produced with the aid of a laser and appropriate coordination of the composition of the lasered material and the inscription parameters, such as the type and wavelength of the laser used, the laser output and the relative speed of the laser and the value document. For one thing, tangible markings make it difficult to counterfeit the value document, and for another, as tactile markings, they provide important information for the blind or the sight impaired. For example, in addition to a serial number, the value of a banknote can also be applied in the form of a tactilely ascertainable marking.

Here, the inscription parameters and the kind and composition of the material of an identifier area can be chosen such that the identifier exhibits both a tangible marking and a color shift. However, it is also possible to produce tangible markings without blackening the identifier. If, for example, labeled security paper is moistened again prior to lasering a tangible, blackened marking, the gray to black appearance disappears and a tangible marking remains, but is barely visually noticeable or not at all.

In a further advantageous embodiment of the value document according to the present invention, at least one of the identifiers is formed by a hidden image. Here, "hidden image" refers to an image structure that is practically invisible under normal viewing conditions, and becomes perceptible only with special aids, such as a microscope or a polarization filter, or under specific viewing conditions, such as under certain, precisely defined viewing angles or upon illumination with ultraviolet radiation.

Preferably, the hidden image is produced by a laser-induced change in a recording region of the value document substrate or in an applied recording layer. For example, the value document can exhibit a locally varying surface structure, locally varying polarization properties or locally varying luminescence properties in the area of the hidden image.

In a further preferred embodiment of the present invention, at least one of the individualizing identifiers is applied to the value document with a non-contact inkjet method. Here, inkjet method is understood to mean both continuous inkjet methods and drop-on-demand methods.

In the first methods mentioned, a continuous inkjet is produced and pressed under pressure through a small nozzle, so that a jet of up to 120,000 uniform drops per second is created. The drops are electrically charged and fly through an electrical field, with the aid of which they are directed to the desired position on the product. With the drop-on-demand methods, which comprise especially piezo and bubble jet methods, ink is conducted through the print head only when a dot is actually intended to be printed. The principle is the same for both methods: a chamber filled with ink is situated in front of the nozzle. Through a reduction of the volume of this chamber, the ink is discharged through the nozzle.

Labeling with the inkjet method defines the location of the marking on the track on which the value document sheet moves under the inkjet heads, but it allows the use of matrix codes or bar codes and other unconventional identifiers. Since the inkjet heads have smaller dimensions than a printing couple, for numbering, they can also be installed in existing printing machines such that they can provide the substrate with an identifier from the reverse side.

According to a further advantageous embodiment, at least one of the individualizing identifiers is applied to the value document with a letterpress method. This conventional identifier is then supplemented by one of the described contactlessly applied identifiers.

Particularly advantageously, the individualizing identifiers on the front and reverse are introduced from the same side of the value document. In this way, a two-sided identifier can be carried out with little equipment outlay and low manufacturing costs. Preferably, the identifiers applied to the front and reverse of the value document are each right reading. To do this, if applicable, the identifiers introduced from the front must be inscribed laterally inverted so that they are right reading when viewed from the reverse side.

The individualizing mark especially constitutes a serial number, a bar code or a matrix code. However, it can also contain additional graphical elements or text, for example a signature or a written out number. The content of the mark can include not only sequential numbers, but also other information, such as a date, a time, a place, a batch designation or inscriptions for special occasions. At least one of the individualizing identifiers can also be cryptographically encoded, or contain a check digit or other correction codes.

Especially when using laser vector coders, the identifier can extend across the entire surface of the value document or cover various sub-areas of the value document. It can be executed as a character string horizontally or vertically, crossed, in the form of a matrix, a triangle, a wave, a circle or an arc (for example in a corner of a banknote) or in any other form. Preferably, at least one of the individualizing identifiers is applied in a wavy, rounded or arcuate form.

With computer-based labeling, additional novel effects can be implemented when numbering banknotes. For example, each half of the digits of a serial number can be inscribed in two spatially offset recording areas, so that a completely readable serial number results only after an appropriate folding of the banknote, through which the two recording regions come to lie next to one another.

The invention also comprises a method for manufacturing a value document having an individualizing mark that is applied at least once each to the front and the reverse of the value document. Here, at least one of the applications on the front and reverse occurs with a non-contact method. Preferably, the individualizing identifiers are applied to the front and reverse of the value document from the same side of the value document.

At least one of the individualizing identifiers is preferably applied to the value document with a non-contact inkjet method. Aternatively or additionally, at least one (additional) of the individualizing identifiers is applied through impingement on the value document by a laser beam. Here, the labeling parameters are advantageously chosen so that the laser-written identifier undergoes a visually perceptible change in color or contrast, especially is blackened. If desired, the labeling parameters can also be chosen so that the laser-written identifier acquires a tangible relief structure, or that the laser-written identifier produces a hidden image that is perceptible only with special aids or under specific viewing conditions.

In an expedient embodiment, prior to laser impingement, one or more recording layers in which one or more of the individualizing identifiers are produced are applied to the value document. Here, as the recording layer, particularly a printing layer or a multilayer security element can be applied in a transfer method.

As the laser source, advantageously, an infrared laser in the wavelength range from 0.8 μm bis 3 μm, especially a Nd:YAG laser is used. Expediently, when labeling, the laser beam is guided across the security substrate with a speed of more than 500 mm/s, preferably of more than 1000 mm/s, particularly preferably of more than 2000 mm/s, to accommodate the high processing speeds in security printing.

Further exemplary embodiments and advantages of the present invention are explained below by reference to the drawings, in which a depiction to scale and proportion was omitted in order to improve their clarity.

Figure 2:
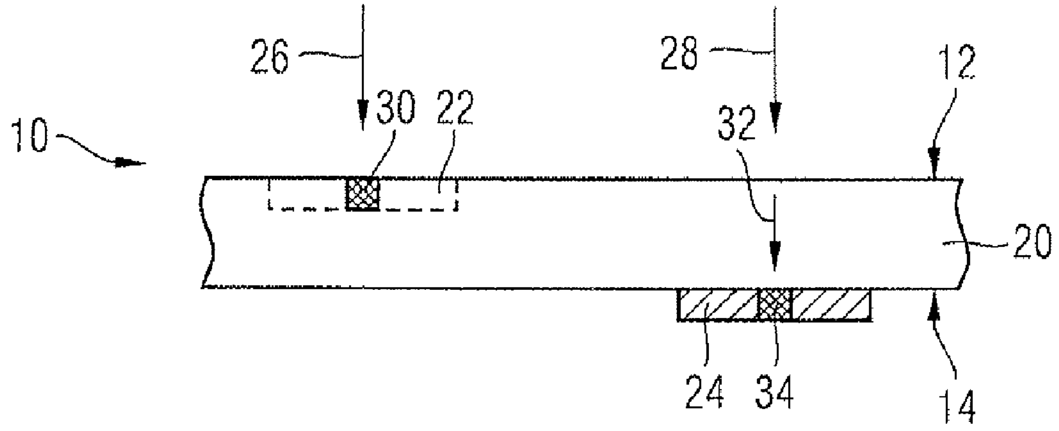
Figure 3:
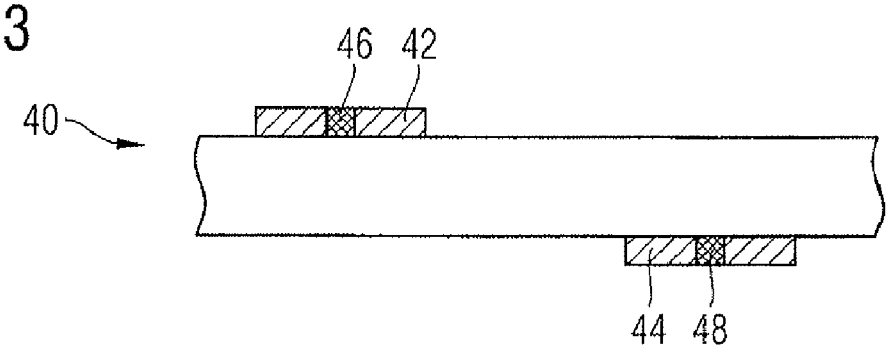
Figure 4:
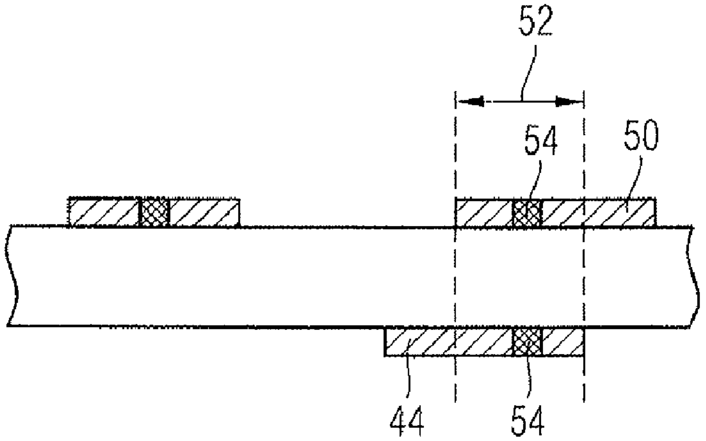
Figure 5:
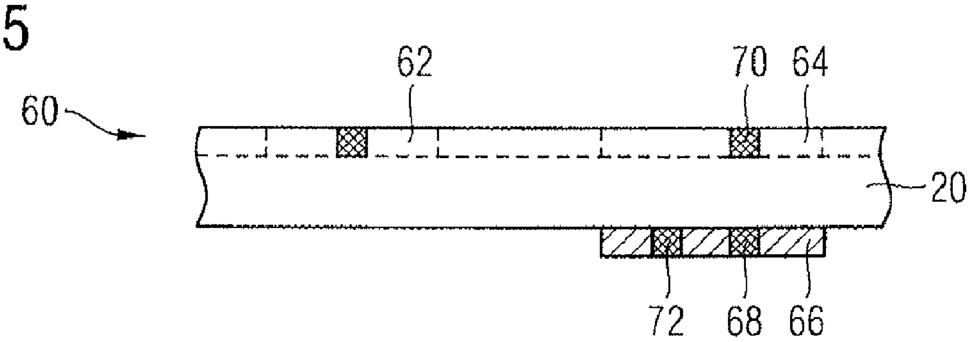
Figure 6:
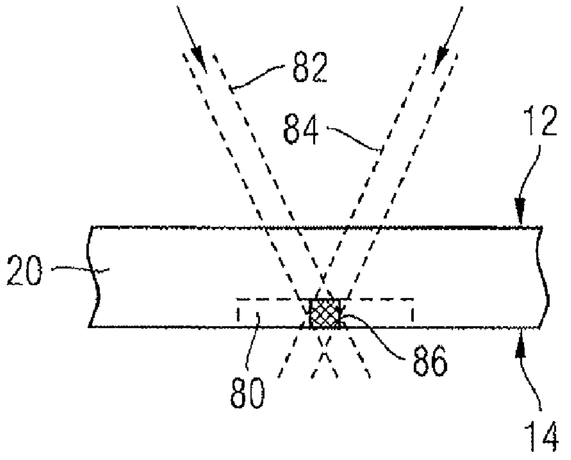
Figure 7:
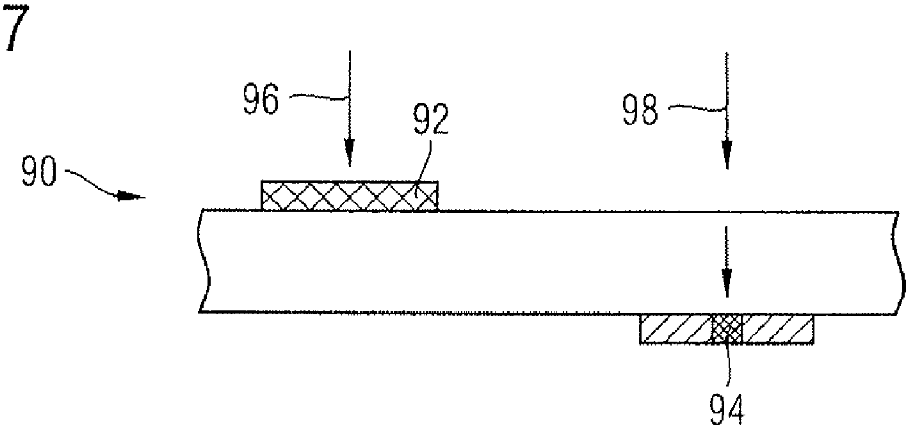
Figure 8:
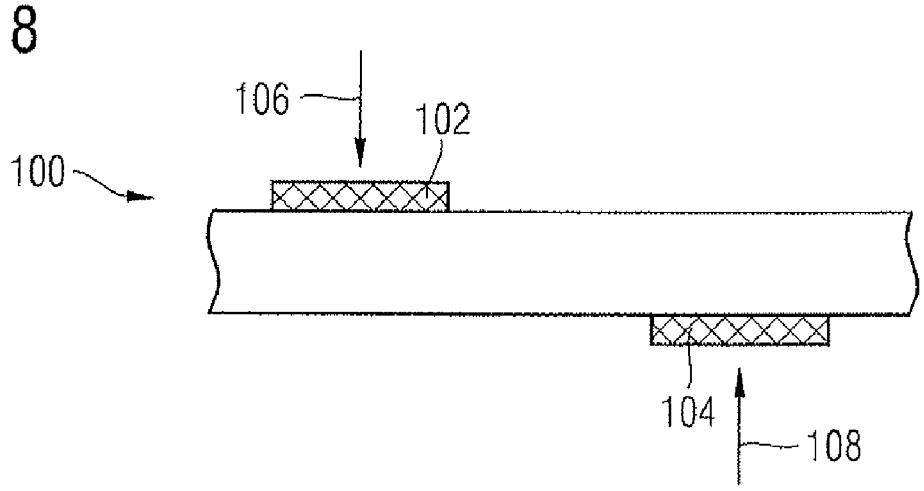
Figure 9:
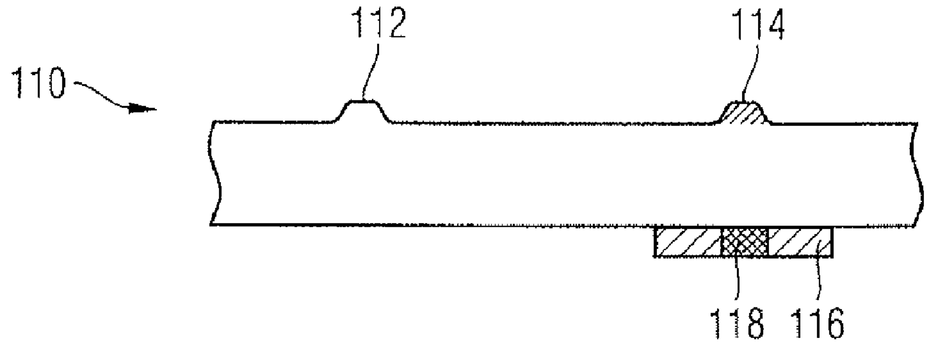
Figure 10:
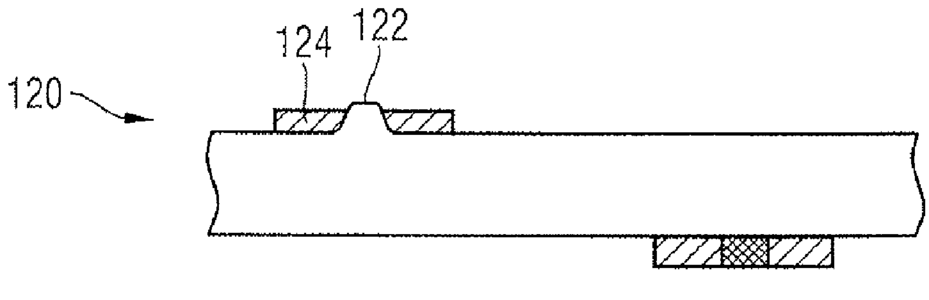
Figure 11:
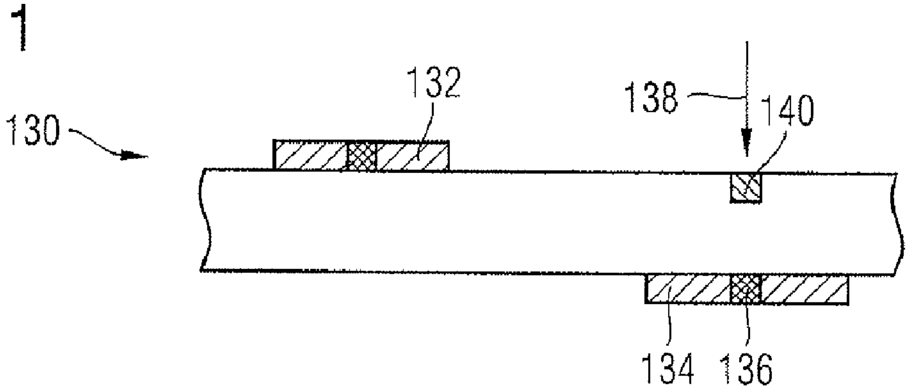
Figure 12:
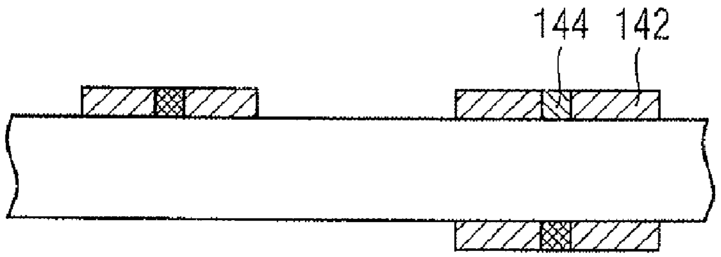
Figure 13A:
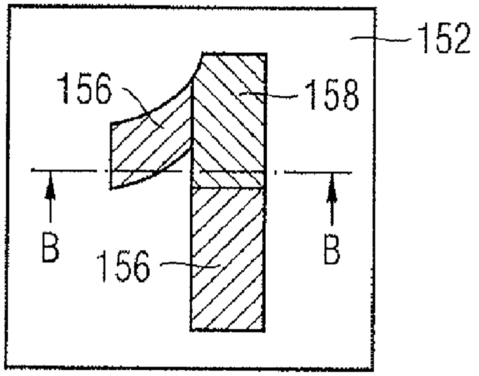
Figure 13B:
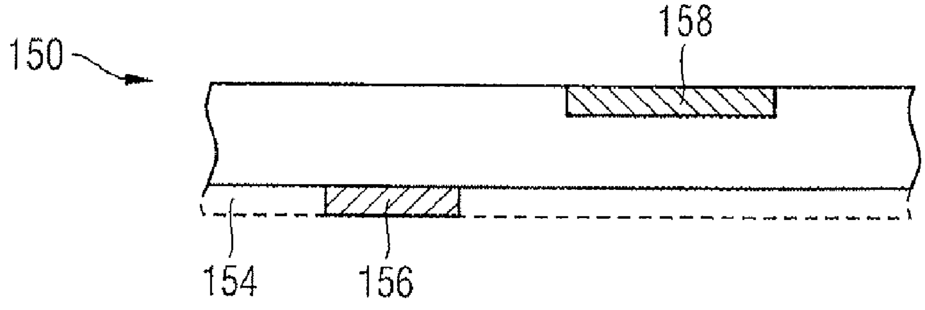
Figure 14:
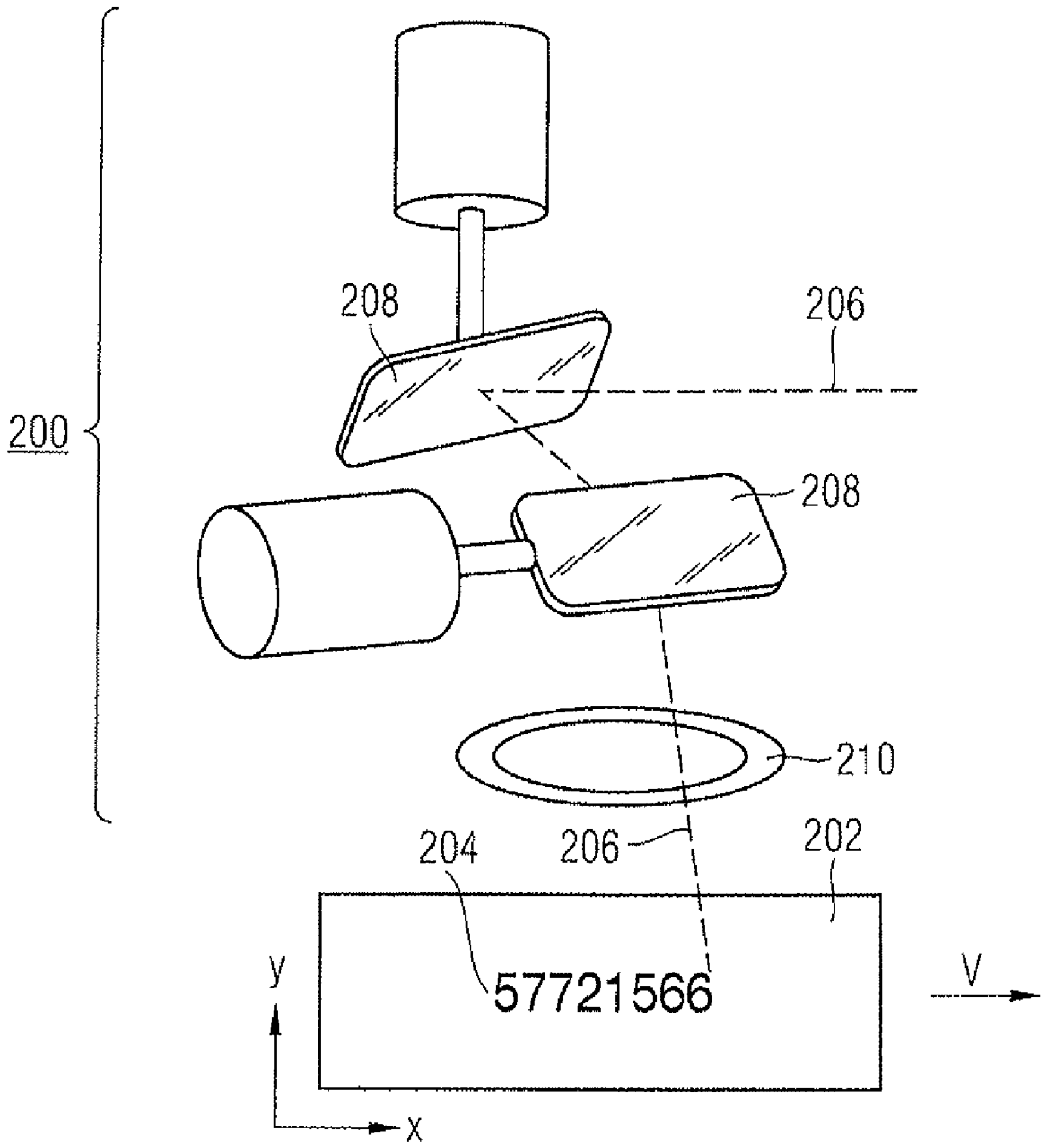
Figure 15:
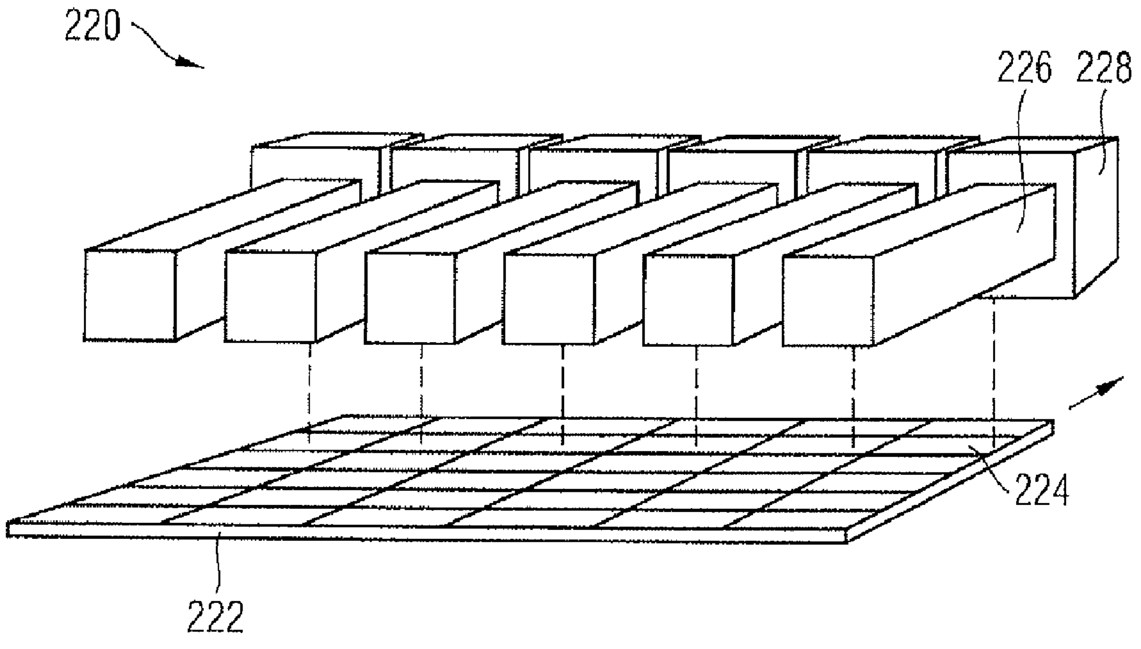

Shown are:

FIG. 1 a schematic diagram of a banknote having two-sided numbering,

FIG. 2 a cross section of a banknote according to an exemplary embodiment of the present invention, FIGS. 3 to 5 cross sections of banknotes according to other exemplary embodiments of the present invention, FIG. 6 a cross section of a banknote substrate to illustrate a reverse-side substrate labeling, FIG. 7 a banknote according to a further exemplary embodiment of the present invention, in which a laser identifier is combined with a conventional numbering, FIG. 8 a banknote according to yet a further exemplary embodiment of the present invention, having an inkjet numbering applied to the reverse, FIGS. 9 and 10 banknotes according to further exemplary embodiments of the present invention, having at least one tangible marking, each shown in cross section, FIGS. 11 and 12 banknotes according to further exemplary embodiments of the present invention having a front-side hidden image, each shown in cross section, FIG. 13 a banknote having a see-through register, (*a*) showing the see-through register schematically as looked through and (*b*) showing the layer structure of the banknote along line B-B, FIG. 14 a schematic diagram of a vector laser coder, and FIG. 15 a schematic diagram of a vector laser coder for inscribing a security sheet.

The invention will now be explained using a banknote as an example. FIG. 1 shows a schematic diagram of a banknote 10, which is provided on each its front 12 and its reverse 14 with a numbering 13 or 15 in the form of the serial number of the banknote. Both numberings 13, 15 constitute embodiments of the same serial number, in the exemplary embodiment the numeric string “1234”.

Both the front-side numbering 13 and the reverse-side numbering 15 are introduced from the front 12 of the banknote by the action of a laser beam, so that the engineering outlay for the two-sided numbering is kept low. In the example shown, the front-side numbering 13 is formed by a blackened area in the security paper of the banknote 10. The reverse-side numbering 15 is formed by a demetallized area in an otherwise metallic-appearing patch 16, for example a transfer element or a label having a diffraction optical structure, and in this way, rich in contrast, stands out from its metallic environment.

The structure and the manufacture of the banknote 10 will now be described more precisely with reference to FIG. 2.

The banknote 10 exhibits, for example, a fibrous paper substrate 20, for example a pure cotton fiber paper or a mixture of cotton and synthetic fibers. However, banknotes composed of pure plastic foils are likewise possible. In order to be able to mark the banknote through impingement by the radiation of an infrared laser, an infrared-absorbing material, in the exemplary embodiment $TiO_2$, is added to the paper substrate 20 so that a recording region 22 is created on the front 12 of the banknote. For the same purpose, the reverse 14 of the banknote 10 is provided with an absorbing recording layer 24, in the exemplary embodiment the hologram patch 16.

For labeling, the banknote 10 is impinged on from the front 12 by the radiation 26, 28 of an infrared laser, for example a pulsed or continuous wave Nd:YAG laser. In the recording region 22, the laser radiation 26 is absorbed by the admixed infrared absorber and causes a local blackening 30 of the substrate. Through suitable beam control, for example a computer-controlled positioning of the laser beam, the blackening 30 can be easily produced in the form of the desired serial number 13.

Since the paper substrate 20 is substantially transparent to the radiation of the Nd:YAG laser, at least at low laser intensity, the incident laser radiation 28 passes through (reference number 32) the substrate 20 in the area of the recording layer 24 and is absorbed only on the reverse 14 of the banknote in the recording layer 24. The metal layer of the hologram patch 16 is locally destroyed by the laser radiation, or in any case so changed in its optical properties that a local color or contrast shift 34 is created for the viewer. In order to obtain a serial number 15 that is right reading from the reverse side, the serial number is inscribed from the front side laterally inverted, which can be done easily with computer-based beam control.

In the further exemplary embodiment in FIG. 3, the front and reverse of the banknote 40 are provided with absorbing layers 42 and 44, for example with printing layers, to whose printing inks IR absorbers are added. Since here, too, the banknote substrate is permeable to the laser radiation, both printing layers 42 and 44 can be altered in color and/or in contrast by irradiating the banknote from the front in the form of the desired numbering (reference numbers 46 and 48).

FIG. 4 shows an extension of the exemplary embodiment in FIG. 3, in which, on the front of the banknote, an additional recording layer 50 is provided that is disposed opposite the reverse-side recording layer 44 in an overlapping area 52. In this overlapping area 52, congruent identifiers 54 can be introduced simultaneously into both recording layers 44, 50 with a laser.

It is understood that, for this purpose, the recording layer 50 is formed so that only part of the laser radiation is absorbed in the recording layer 50 and part passes through the substrate to the reverse-side recording layer 44. Naturally, the areas of the recording layers 44, 50 outside of the overlapping area 52 can be provided with additional identifiers that are applied separately for the front and reverse. Because of the register-based configuration of the identifiers 54, an attempted imitation by inscribing the banknote from the reverse side can easily be recognized as a counterfeit.

In the variation of a banknote 60 shown in FIG. 5, front-side recording regions 62, 64 within the banknote substrate 20 are produced by adding a small dosage of soot. The reverse of the banknote 60 is provided with a recording layer 66, a silver screen printing layer in the exemplary embodiment. When labeling the banknote 60 from the front, through suitable choice of the laser parameters, it can be achieved that only part, namely the reverse-side identifier part 68 that is inscribed with high laser energy, simultaneously produces a visible blackening 70 on the front. In contrast, the reverse-side identifier part 72 that is inscribed with low laser energy does not appear on the front.

While in the exemplary embodiments described so far, the reverse-side labeling always occurred with the aid of a recording layer, the reverse-side identifier can also be produced in a recording area within the paper substrate, as explained with reference to FIG. 6. The paper substrate 20 to which infrared absorbers have been added is blackened through irradiation from the front 12 in a recording region 80 on its reverse 14, by aiming two laser beams 82 and 84 or an appropriately split laser beam at the substrate 20 at an angle, so that the two beams 82 and 84 overlap in the recording region 80 on the reverse of the substrate. Through suitable choice of the beam intensities, it can be achieved that the blackening threshold of the substrate 20 is exceeded only in the overlapping area 86 of the two laser beams and a blackening thus occurs only in the reverse-side recording region 80.

In the exemplary embodiment in FIG. 7, a first numbering 92 is applied to the front of the banknote 90 in conventional letterpress 96. The second, reverse-side numbering 94 is likewise performed from the front side (reference number 98) with a vector laser coder, so that all devices needed for numbering can be disposed on the front side of the banknote 90. The laser-written numbering 94 remains invisible on the front of the banknote, since the substrate material does not react with the laser radiation, or at least not sufficiently, to produce a visible marking.

Advantageously, the letterpress numbering is not switched mechanically, but rather electrically from one numeral to the next. In this way, the correspondence between the front-side numbering 92 and the reverse-side numbering 94 can be ensured by addressing through a common computing unit. In place of the letterpress numbering, the front-side numbering 92 can also be applied with an inkjet method.

FIG. 8 shows a banknote 100 according to a further exemplary embodiment of the present invention, in which the banknote substrate is provided with a letterpress or inkjet numbering 102 from the front side (reference number 106), and in which an inkjet numbering 104 is applied to the reverse from the reverse side by means of an inkjet method 108. Due to the simple architecture of inkjet print heads, the outlay for equipping the printer unit with an additional inkjet print head for the reverse-side numbering is economically justifiable in view of the design freedom gained. The reverse-side numbering can also be introduced from the reverse side with a laser. For example, to do this, the laser radiation can be guided from the front side via an optical waveguide to the reverse, so that the cited advantages of free addressability and the diverse inscription options are achieved here, too.

In other embodiments of the present invention, of which a first exemplary embodiment is depicted in FIG. 9, at least one of the individualizing identifiers exhibits a tangible marking 112, 114 having a relief structure that is produced by the action of a laser beam on the banknote substrate 110. Without being bound to a certain explanation, the creation of the tangible marking is explained by the breaking of the sized surface of the substrate 110 under the influence of the laser radiation. The fiber composite is loosened and hollow spaces form between the fibers, likely due to gas formation. Thus, a coarse-meshed fiber netting occurs locally that protrudes tangibly above the original surface but remains held together by the size layer. Touching such a substrate protrusion gives a tactilely well ascertainable, soft and almost velvety impression.

The height of the tangible marking above the surface can be varied within a broad scope through the choice of laser parameters, the substrate material and the relative speed of the laser beam and the banknote during inscription. Typically, a height between 30 μm and about 100 μm is chosen. In addition to producing a tangible substrate protrusion, the laser radiation can also produce a color shift, especially a blackening of the substrate, as indicated by hatching for the marking 114. Whether and to what extent a blackening is produced depends, in addition to the laser parameters, primarily on the composition of the substrate material.

In the exemplary embodiment, the first tangible marking 112 was produced with low laser intensity, so that no blackening of the substrate occurred there. In the area of the reverse-side recording layer 116, a higher laser intensity was used, so that a blackened substrate protrusion 114 is created on the front of the banknote, and a local color and/or contrast change 118 in the recording layer 116 on the reverse. The color and/or contrast change is preferably a blackening of the recording layer. Alternatively, the area 118 of the recording layer 116 can also be lightened by the laser action.

A combination of a tangible substrate protrusion 122 with a smooth recording layer 124 on the front of the substrate, as shown for banknote 120 in FIG. 10, has turned out to be particularly effective. The smooth recording layer 124 can be, for example, a tag-shaped or strip-shaped element, these elements preferably exhibiting a diffraction optical structure having a metallic reflection layer. It is understood that such a front-side identifier can also be combined with an opposing reverse-side identifier, for example through an appropriate recording layer on the reverse of the substrate.

An additional security aspect results when the substrate of the value document is processed such that, when inscribing a reverse-side identifier through the substrate, a hidden image of the inscribed identifier is created on the front and is perceptible only with special aids or under specific viewing conditions. In this way, a counterfeit can be detected through an authenticity test on a second, more complex testing level.

FIG. 11 shows a corresponding exemplary embodiment of the present invention, in which the banknote 130 exhibits a front-side recording layer 132 and a reverse-side recording layer 134. When inscribing the reverse-side identifier 136 with an infrared laser 138, the polarization properties of the front of the substrate are simultaneously changed at the sites 140 impinged upon, without producing a blackening or another easily perceptible color shift in the substrate. The identifier inscribed on the reverse can then also be detected on the front when viewed with a polarization filter.

By applying an additional detection layer 142 on the front of the substrate, as illustrated in FIG. 12, a large variety of forensic detection effects can be availed of. For example, the detection layer 142 can comprise a thermoplastic material with a small admixture of an IR absorber. Then, when laser labeling the reverse of the banknote, corresponding smooth areas 144 are produced in the detection layer 142 and can be made visible under the microscope or by tilting the banknote to the angle of incidence. In another exemplary embodiment, the detection layer can contain a luminescent, especially a fluorescent, ink whose luminescence is locally quenched by the action of the laser radiation.

The exemplary embodiment in FIG. 13 shows a banknote 150 having a see-through register 152 in which both sides of the banknote 150 each show just one discontinuous partial representation of the inscribed identifier, and the complete identifier image is perceptible only when looked through. In FIG. 13(*a*), the see-through register 152 is depicted schematically with the viewing impression when looked through, the partial representations visible when looked at from the front and reverse being shown with differing hatchings. FIG. 13(*b*)

illustrates the layer structure through a sectional representation of the banknote along line B-B of the see-through register.

To manufacture such a see-through register 152, the reverse of the banknote is first provided with an absorbing and opaque coating layer 154, for example a metal or opaque printing layer. The opaque coating layer 154 is partially removed or transformed into a transparent modification by irradiating the banknote from the front side, so that only sub-regions 156 of the coating layer 154 remain on the reverse.

Then the front of the banknote is impinged on by high-intensity laser radiation, so that visible, if appropriate also tangible, identifier areas 158 are produced on the front. The design of the identifier areas 156 and 158 is coordinated so that, together, they result in the desired identifier when looked through, in the exemplary embodiment the numeral "1". Since both identifier areas 156, 158 are produced with the same laser beam, the register is perfect and thus has a high security value. Moreover, especially for tangible identifiers, it is clearly perceptible that the identifier was lasered.

FIG. 14 schematically shows the scan head 200 of a vector laser coder with which a substrate 202 is provided with a serial number 204. The substrate 202 can be a value document that has already been completely cut, a sheet having multiple panels of a value document, or a continuous-form security paper.

An infrared laser beam 206 is deflected via two movable mirrors 208, one of the mirrors producing the deflection in the x-direction, and the other mirror the deflection in the y-direction. A plane-field lens 210 focuses the laser beam 206 on the substrate 202, where it produces on the front and/or reverse, in the manner described above, an identifier, here a serial number 204. The substrate 202 moves during the labeling process with a certain speed v. This speed is detected by sensors and transmitted to a computer to control the movement of the mirrors 208 such that the substrate speed v is compensated during inscribing. This labeling method can thus be employed particularly advantageously for the non-contact labeling of value documents that are processed at high speeds, as usual in printing plants.

The substrate 202 can also be marked in another way, for example by means of a matrix of punctiformly emerging laser beams or by means of beams with larger cross-section that are partially covered by a stencil. Such stencils can be automatically variably implemented. If it is not possible or not desired to guide the radiation in line with the substrate speed, it is also possible to label moving substrates by choosing a short exposure time. Beam control through polygon mirrors is also possible.

Depending on the substrate used, $CO_2$ lasers, Nd:YAG lasers or other laser types in the wavelength range from UV to far infrared may be used as the radiation source, the lasers also often working advantageously with frequency doubling or tripling. Preferably, however, laser sources in the near infrared are employed, since this wavelength range is well suited to the absorption properties of the substrates and printing inks used. Depending on the application, the spot size of the laser radiation can be varied from a few micrometers to a few millimeters, for example by changing the distance between the plane-field lens 210 and the substrate 202.

The continuous output of the laser coder used typically lies between a few watts and a few hundred watts. Nd:YAG lasers can be operated with laser diodes for low total output with smaller construction dimensions and high beam quality, or with pump lamps for high outputs. In order to not reduce the speeds of an industrial value document production line, the labelings are advantageously executed with very fast-moving galvanometers, which can guide the beam across the substrate at more than 1000 mm/s, preferably at up to 4000 mm/s. At these speeds, only a small proportion of energy is deposited in the substrate or the coating for each section, so that, advantageously, lamp-pumped Nd:YAG lasers with an output of about 100 watts are employed.

By varying the inscription parameters, such as the laser output, exposure time, spot size, inscription speed, working mode of the laser etc., the labeling results can be varied within a broad scope. For example, the height of the tangible markings produced by the laser can be varied accordingly. Preferably, the tangible markings have a height from 30 to 100 μm. Likewise, the composition of the paper substrate is advantageously adapted to the laser radiation or the laser output used.

The identifiers are undertaken for example with a Nd:YAG laser having a fundamental wavelength of 1064 nm and exhibiting an average output of 26 W and a modulation frequency of 8 kHz. The diameter of the laser beam on the substrate (spot size) is about 100 μm and the traverse speeds of the laser beam across the substrate 250 to 4000 mm/s. The typical height of a tangible identifier thus produced lies between 30 and 80 μm. In individual cases, i.e. especially at low traverse speeds, considerably higher values can also be achieved, for example a height of more than 100 μm at 250 mm/s. The width of the marks normally lies between 0.2 and 0.6 mm.

For a calendered cotton-vellum paper with a density of 90 $g/m^2$, at an inscription speed of 330 mm/s for example, tangible markings result having an average relief height of 70 μm and a line width of about 500 μm. At an inscription speed of 675 mm/s, the relief height achievable at the same line width is merely 40 μm. In a paper composed of a mixture of cotton and plastic fibers having a plastic fiber share of 12.5 weight % and an area weight of 90 $g/m^2$ (so-called Synthek paper), the measurements of the marking produced at 250 mm/s are 65 μm average height and approximately 0.5 mm average width. When the traverse speed was increased to 1000 mm/s, the measurements were 35 μm average height and 0.3 mm average width.

FIG. 15 shows a laser coder 220 in which a sheet 222 is provided, with a plurality of lasers simultaneously, with an identifier according to the present invention. In the case shown, the sheet 222 exhibits six columns and six rows, so that on this sheet 36 individual panels 224 are disposed on value documents. For each column, disposed above the printing sheet 222 is a laser tube 226, which provides, together with the associated scan head 228, each of the individual panels 224 disposed in this column with the identifiers according to the present invention. Through this configuration, the throughput can be greatly increased, since a single laser beam must not be moved across the entire print sheet, but rather merely one movement is required parallel to the columns of the printing sheet. The inscription of the individual panels occurs, as described for FIG. 14, through the deflection of the laser radiation by means of the mirrors contained in the scan heads 228.

The invention claimed is:

1. A value document having an individualizing mark that is represented by at least two individualizing identifiers, wherein at least one of the individualizing identifiers is applied to the front and at least one of the individualizing identifiers is applied to the reverse of the value document, at least one of the individualizing identifiers being applied to the value document with a non-contact method, wherein the individualizing identifiers on the front and reverse are introduced from the same side of the value document; wherein on the front and/or the reverse of the value document, at least one laser-sensitive identifier area is disposed that is provided with an individualizing identifier by the action of a laser beam; wherein at least one of the identifier areas is formed by a laser-sensitive recording layer applied to the value document; and wherein the laser-sensitive recording layer comprises a printing layer.

2. The value document according to claim 1, characterized in that opposing identifier areas containing congruent identifiers are disposed on the front and reverse.

3. The value document according to claim 1, characterized in that at least one of the identifiers exhibits a visually perceptible color shift.

4. The value document according to claim 1, characterized in that at least one of the identifiers exhibits a tangible marking having a relief structure.

5. The value document according to claim 1, characterized in that at least one of the identifiers is formed by a hidden image that is perceptible only with special aids or under specific viewing conditions.

6. The value document according to claim 5, characterized in that the hidden image is produced by a laser-induced change in a recording region of the value document substrate or in an applied recording layer.

7. The value document according to claim 5, characterized in that the value document exhibits a locally varying surface structure, locally varying polarization properties or locally varying luminescence properties in the area of the hidden image.

8. The value document according to claim 1, characterized in that at least one of the individualizing identifiers is applied to the value document with a non-contact inkjet method.

9. The value document according to claim 1, characterized in that at least one of the individualizing identifiers is applied to the value document with a letterpress method.

10. The value document according to claim 1, characterized in that the identifiers applied to the front and reverse of the value document are each right reading.

11. The value document according to claim 1, characterized in that the individualizing mark constitutes a serial number, a bar code or a matrix code.

12. The value document according to claim 1, characterized in that at least one of the individualizing identifiers is cryptographically encoded.

13. The value document according to claim 1, characterized in that at least one of the individualizing identifiers is applied in a wavy, rounded or arcuate form.

14. A method for manufacturing a value document having an individualizing mark that is represented by at least two individualizing identifiers, wherein at least one of the individualizing identifiers is applied to the front and at least one of the individualizing identifiers is applied to the reverse of the value document, and in which at least one of the individualizing identifiers is applied to the value document with a non-contact method, wherein the document is provided with the at least two individualizing identifiers by applying the identifiers to the front and reverse of the value document from the same side of the value document; wherein at least one of the individualizing identifiers is applied through impingement on the value document by a laser beam; wherein prior to laser impingement, one or more recording layers in which one or more of the individualizing identifiers are produced are applied to the value document; and wherein the one or more recording layers comprise a printing layer.

15. The method according to claim 14, characterized in that at least one of the individualizing identifiers is applied to the value document with a non-contact inkjet method.

16. The method according to claim 14, characterized in that at least one of the individualizing identifiers is applied through impingement on the value document by a laser beam.

17. The method according to claim 14, characterized in that the labeling parameters are chosen so that the laser-written identifier undergoes a visually perceptible change in color or contrast.

18. The method according to claim 14, characterized in that the labeling parameters are chosen so that the laser-written identifier acquires a tangible relief structure.

19. The method according to claim 14, characterized in that the labeling parameters are chosen so that the laser-written identifier produces a hidden image that is perceptible only with special aids or under specific viewing conditions.

20. The method according to claim 14, characterized in that, as the recording layer, a multilayer security element is applied in a transfer method.

21. The method according to claim 14, characterized in that an infrared laser in the wavelength range between 0.8 μm and 3 μm is used as the laser source.

22. The method according to claim 14, characterized in that, for the identifier, the laser beam is guided across the security substrate with a speed of more than 500 mm/s.

23. The value document according to claim 1, characterized in that the laser-sensitive recording layer comprises a printing layer, wherein the printing layer comprises an intaglio printing layer, a screen printing layer, an effect ink layer, an absorbing ink layer, or a printing layer composed of a mixture of a non-absorbing printing ink with an absorbing ink or other absorbing materials.

24. A value document having an individualizing mark that is represented by at least two individualizing identifiers, wherein at least one of the individualizing identifiers is applied to the front and at least one of the individualizing identifiers is applied to the reverse of the value document, at least one of the individualizing identifiers being applied to the value document with a non-contact method, wherein the individualizing identifiers on the front and reverse are introduced from the same side of the value document; wherein on the front and/or the reverse of the value document, at least one laser-sensitive identifier area is disposed that is provided with an individualizing identifier by the action of a laser beam; wherein at least one of the identifier areas is formed by a laser-sensitive recording layer applied to the value document; and wherein the laser-sensitive recording layer comprises a metal layer.

25. The value document according to claim 24, characterized in that at least one of the identifiers exhibits a visually perceptible color shift.

26. The value document according to claim 24, characterized in that at least one of the identifiers exhibits a tangible marking having a relief structure.

27. The value document according to claim 24, characterized in that at least one of the identifiers is formed by a hidden image that is perceptible only with special aids or under specific viewing conditions.

28. The value document according to claim 27, characterized in that the hidden image is produced by a laser-induced change in a recording region of the value document substrate or in an applied recording layer.

29. The value document according to claim 27, characterized in that the value document exhibits a locally varying surface structure, locally varying polarization properties or locally varying luminescence properties in the area of the hidden image.

30. The value document according to claim 24, characterized in that at least one of the individualizing identifiers is applied to the value document with a non-contact inkjet method.

31. The value document according to claim 24, characterized in that at least one of the individualizing identifiers is applied to the value document with a letterpress method.

32. The value document according to claim 24, characterized in that the identifiers applied to the front and reverse of the value document are each right reading.

33. The value document according to claim 24, characterized in that the individualizing mark constitutes a serial number, a bar code or a matrix code.

34. The value document according to claim 24, characterized in that at least one of the individualizing identifiers is cryptographically encoded.

35. The value document according to claim 24, characterized in that at least one of the individualizing identifiers is applied in a wavy, rounded or arcuate form.

36. The value document according to claim 24, characterized in that the laser-sensitive recording layer comprises a metal layer, wherein the recording layer is formed by a security element provided with a metallic strip or patch.

37. The value document according to claim 24, wherein the at least one reverse-side identifier is formed by a demetallized area in an otherwise metallic-appearing patch.

38. A method for manufacturing a value document having an individualizing mark that is represented by at least two individualizing identifiers, wherein at least one of the individualizing identifiers is applied to the front and at least one of the individualizing identifiers is applied to the reverse of the value document, and in which at least one of the individualizing identifiers is applied to the value document with a non-contact method, wherein the document is provided with the at least two individualizing identifiers by applying the identifiers to the front and reverse of the value document from the same side of the value document; wherein at least one of the individualizing identifiers is applied through impingement on the value document by a laser beam; wherein prior to laser impingement, one or more recording layers in which one or more of the individualizing identifiers are produced are applied to the value document; and wherein the one or more recording layers comprise a metal layer.

39. The method according to claim 38, characterized in that at least one of the individualizing identifiers is applied to the value document with a non-contact inkjet method.

40. The method according to claim 38, characterized in that the labeling parameters are chosen so that the laser-written identifier undergoes a visually perceptible change in color or contrast.

41. The method according to claim 38, characterized in that the labeling parameters are chosen so that the laser-written identifier acquires a tangible relief structure.

42. The method according to claim 38, characterized in that the labeling parameters are chosen so that the laser-written identifier produces a hidden image that is perceptible only with special aids or under specific viewing conditions.

43. The method according to claim 38, characterized in that an infrared laser in the wavelength range between 0.8 μm and 3 μm is used as the laser source.

44. The method according to claim 38, characterized in that, for the identifier, the laser beam is guided across the security substrate with a speed of more than 500 mm/s.

45. A value document having an individualizing mark that is represented by at least two individualizing identifiers, wherein at least one of the individualizing identifiers is applied to the front and at least one of the individualizing identifiers is applied to the reverse of the value document, at least one of the individualizing identifiers being applied to the value document with a non-contact method, wherein the individualizing identifiers on the front and reverse are introduced from the same side of the value document; wherein on the front and/or the reverse of the value document, at least one laser-sensitive identifier area is disposed that is provided with an individualizing identifier by the action of a laser beam; wherein at least one of the identifier areas is formed by a laser-sensitive recording region in the substrate of the value document; and wherein the laser-sensitive recording region is produced by introducing absorbing substances into the value document substrate.

46. The value document according to claim 45, characterized in that the laser-sensitive recording region contains $TiO_2$, soot particles, interference pigments or infrared absorbers.

47. The value document according to claim 45, characterized in that at least one of the identifiers exhibits a visually perceptible color shift.

48. The value document according to claim 45, characterized in that at least one of the identifiers exhibits a tangible marking having a relief structure.

49. The value document according to claim 45, characterized in that at least one of the identifiers is formed by a hidden image that is perceptible only with special aids or under specific viewing conditions.

50. The value document according to claim 49, characterized in that the hidden image is produced by a laser-induced change in a recording region of the value document substrate or in an applied recording layer.

51. The value document according to claim 49, characterized in that the value document exhibits a locally varying surface structure, locally varying polarization properties or locally varying luminescence properties in the area of the hidden image.

52. The value document according to claim 45, characterized in that at least one of the individualizing identifiers is applied to the value document with a non-contact inkjet method.

53. The value document according to claim 45, characterized in that at least one of the individualizing identifiers is applied to the value document with a letterpress method.

54. The value document according to claim 45, characterized in that the identifiers applied to the front and reverse of the value document are each right reading.

55. The value document according to claim 45, characterized in that the individualizing mark constitutes a serial number, a bar code or a matrix code.

56. The value document according to claim 45, characterized in that at least one of the individualizing identifiers is cryptographically encoded.

57. The value document according to claim 45, characterized in that at least one of the individualizing identifiers is applied in a wavy, rounded or arcuate form.

58. A method for manufacturing a value document having an individualizing mark that is represented by at least two individualizing identifiers, wherein at least one of the individualizing identifiers is applied to the front and at least one of the individualizing identifiers is applied to the reverse of the value document, and in which at least one of the individualizing identifiers is applied to the value document with a non-contact method, wherein the document is provided with the at least two individualizing identifiers by applying the identifiers to the front and reverse of the value document from the same side of the value document; wherein at least one of the individualizing identifiers is applied through impingement on the value document by a laser beam; wherein at least one of the identifier areas is formed by a laser-sensitive recording region in the substrate of the value document; and wherein the laser-sensitive recording region is produced by introducing absorbing substances into the value document substrate.

59. The method according to claim 58, characterized in that at least one of the individualizing identifiers is applied to the value document with a non-contact inkjet method.

60. The method according to claim 58, characterized in that the labeling parameters are chosen so that the laser-written identifier undergoes a visually perceptible change in color or contrast.

61. The method according to claim 58, characterized in that the labeling parameters are chosen so that the laser-written identifier acquires a tangible relief structure.

62. The method according to claim 58, characterized in that the labeling parameters are chosen so that the laser-written identifier produces a hidden image that is perceptible only with special aids or under specific viewing conditions.

63. The method according to claim 58, characterized in that an infrared laser in the wavelength range between 0.8 μm and 3 μm is used as the laser source.

64. The method according to claim 58, characterized in that, for the identifier, the laser beam is guided across the security substrate with a speed of more than 500 mm/s.

* * * * *